April 26, 1955          J. D. TURLAY          2,706,948
DEPTH REGULATING DEVICE FOR A MOORED MINE
Filed Nov. 17, 1942          9 Sheets-Sheet 4
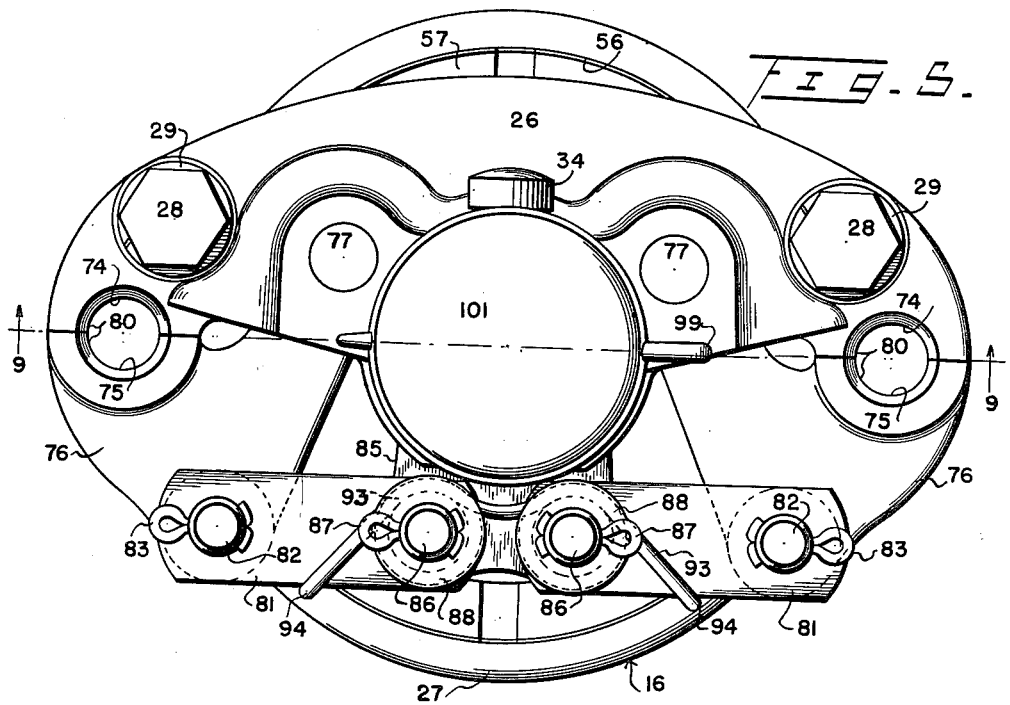
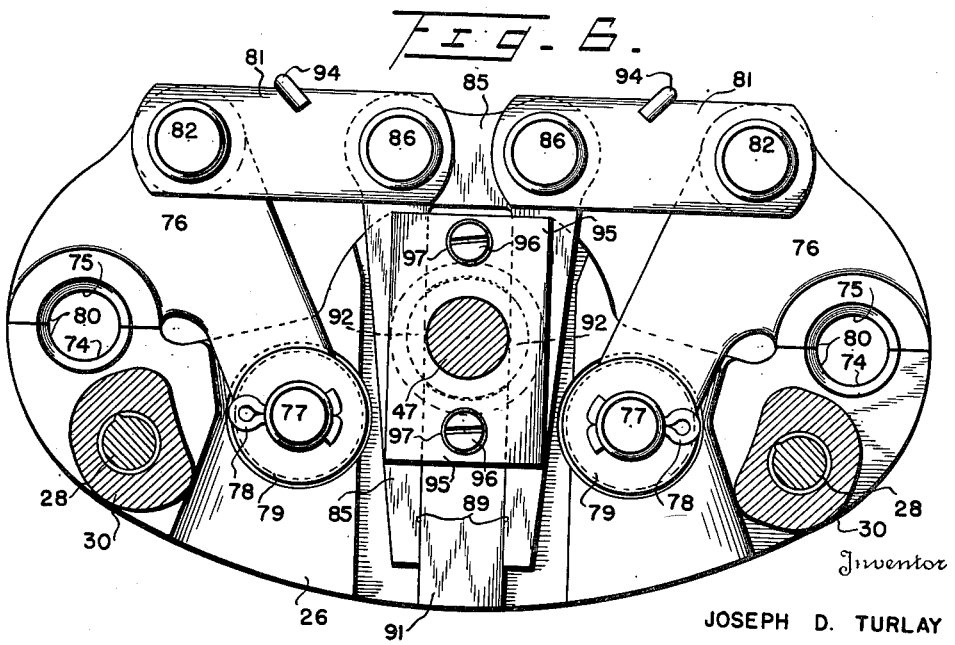
Inventor
JOSEPH D. TURLAY
By
Attorney

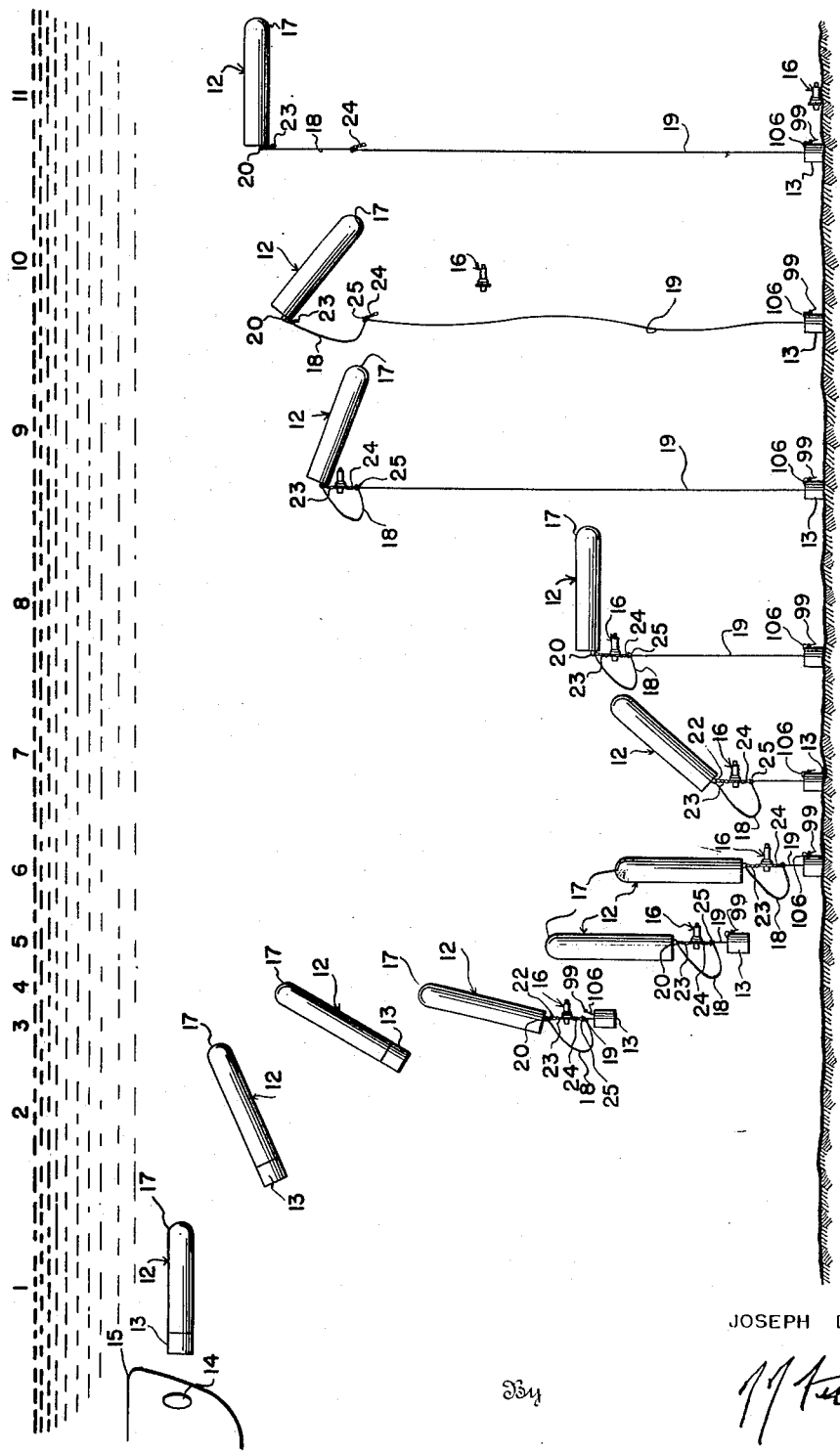

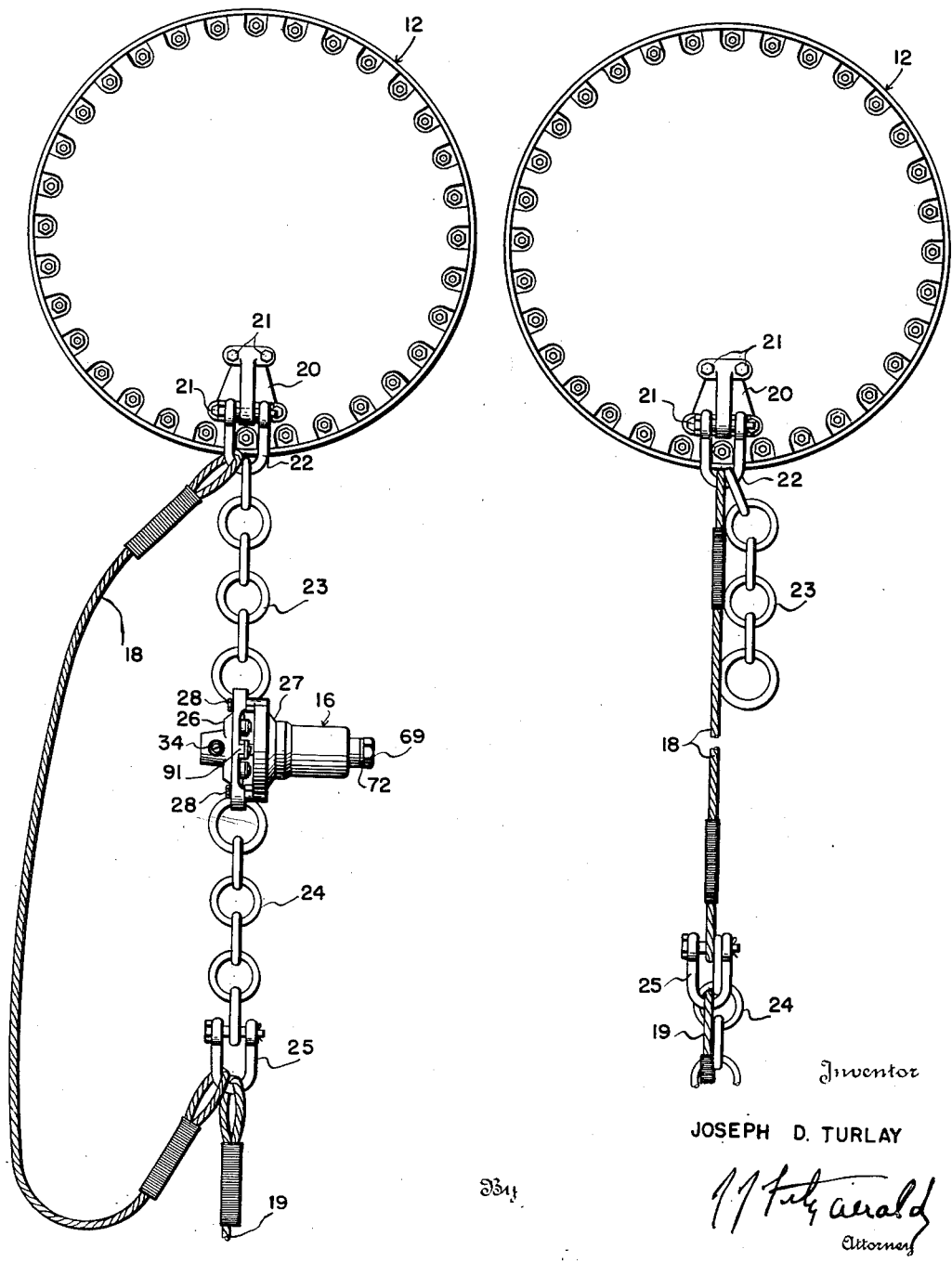

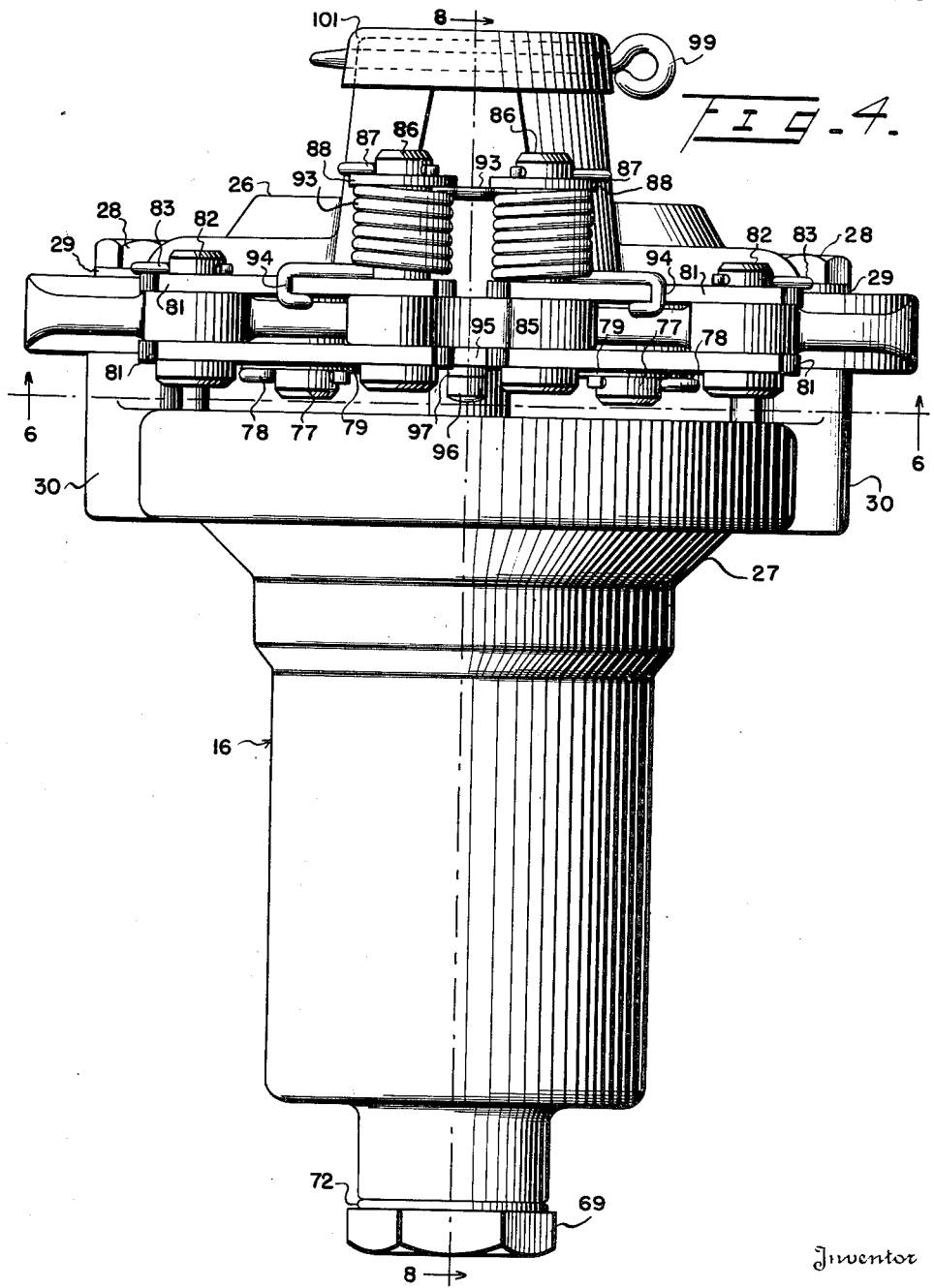

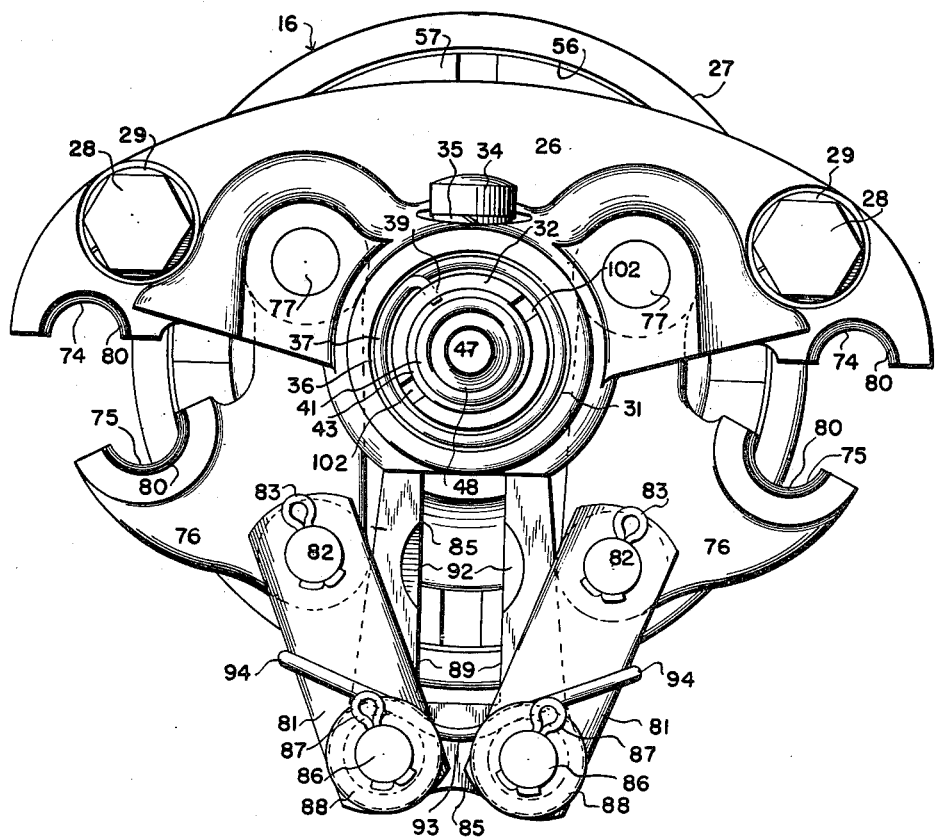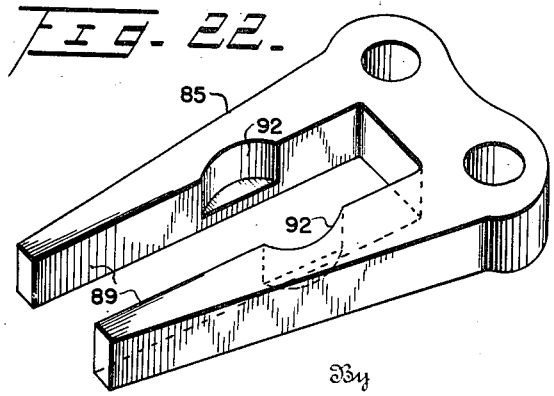

April 26, 1955
J. D. TURLAY
2,706,948
DEPTH REGULATING DEVICE FOR A MOORED MINE
Filed Nov. 17, 1942
9 Sheets-Sheet 6
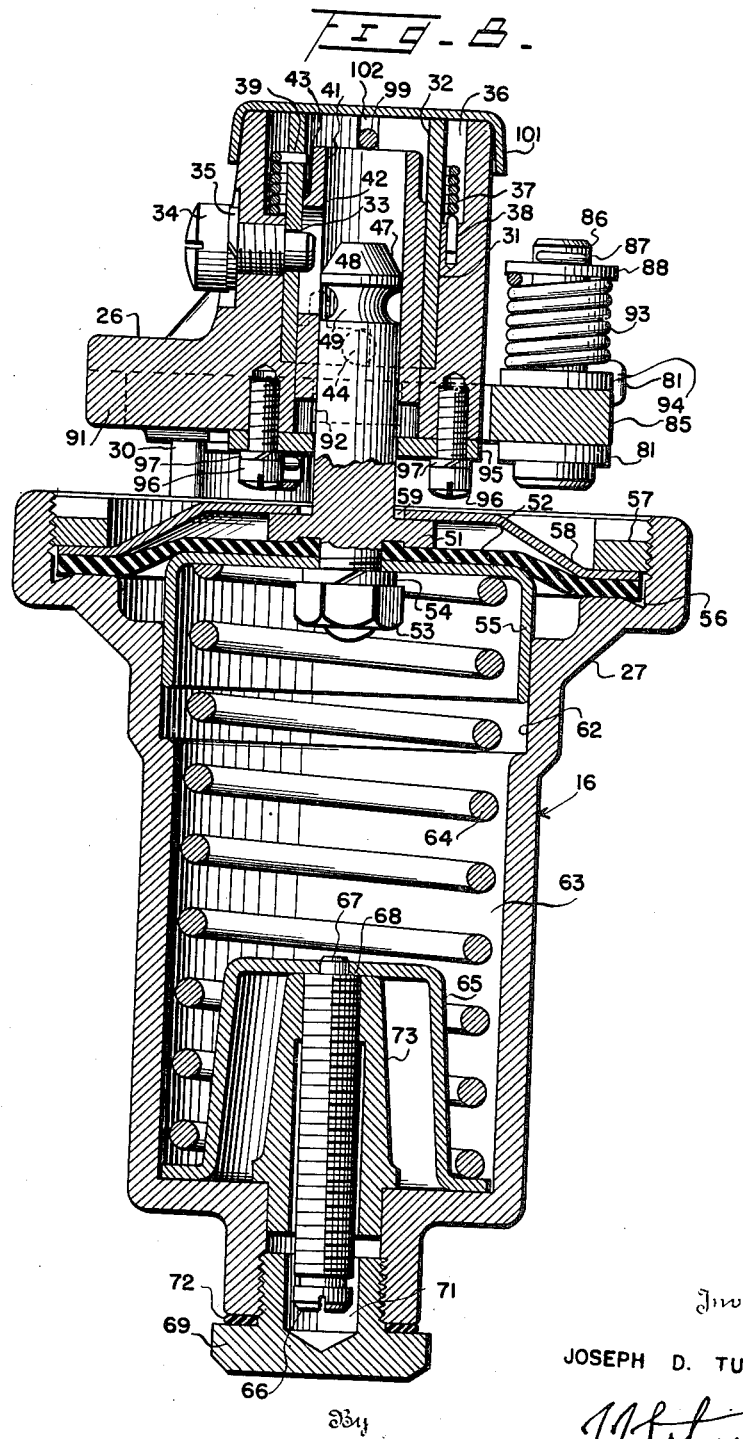
Inventor.
JOSEPH D. TURLAY
By
Attorney

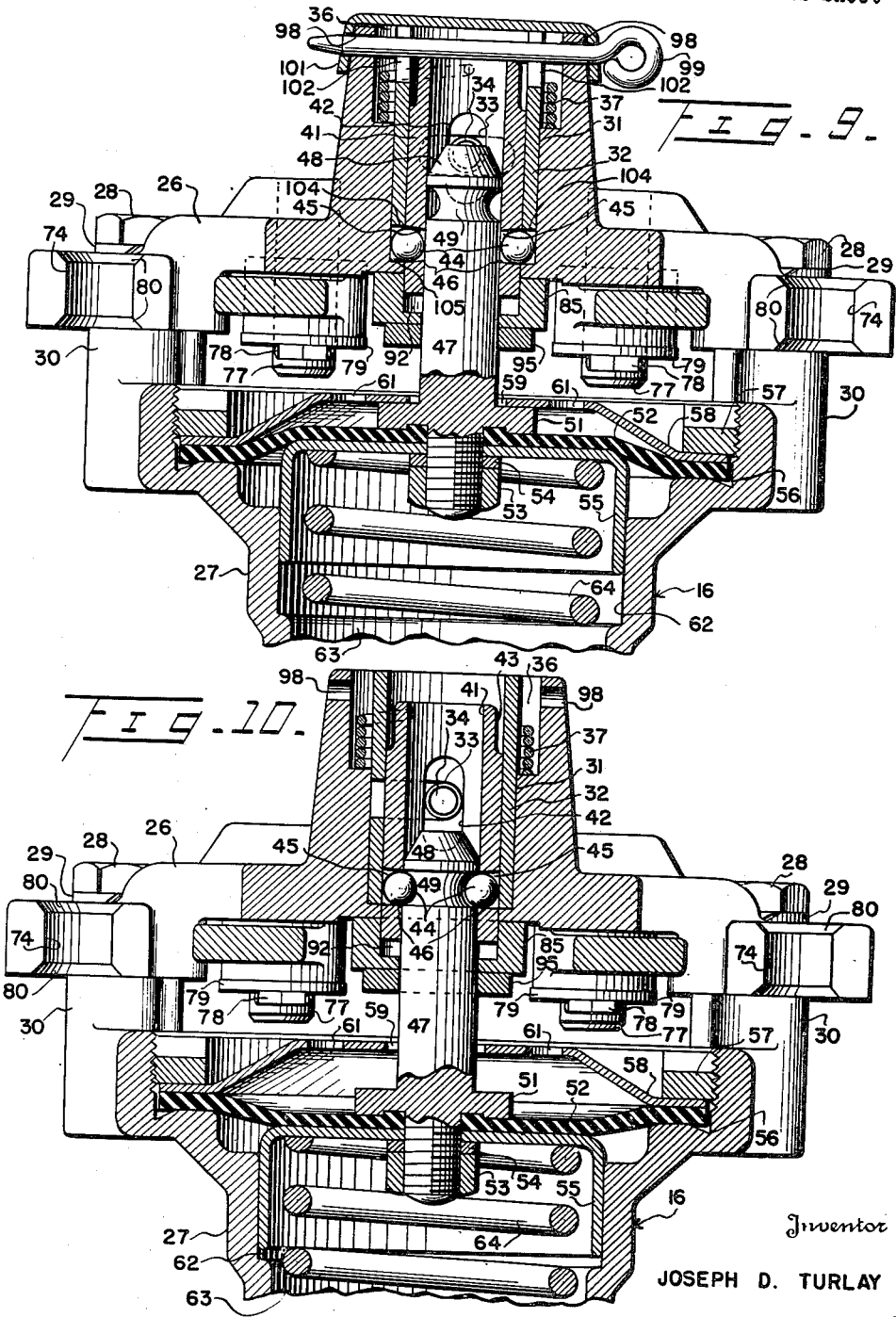

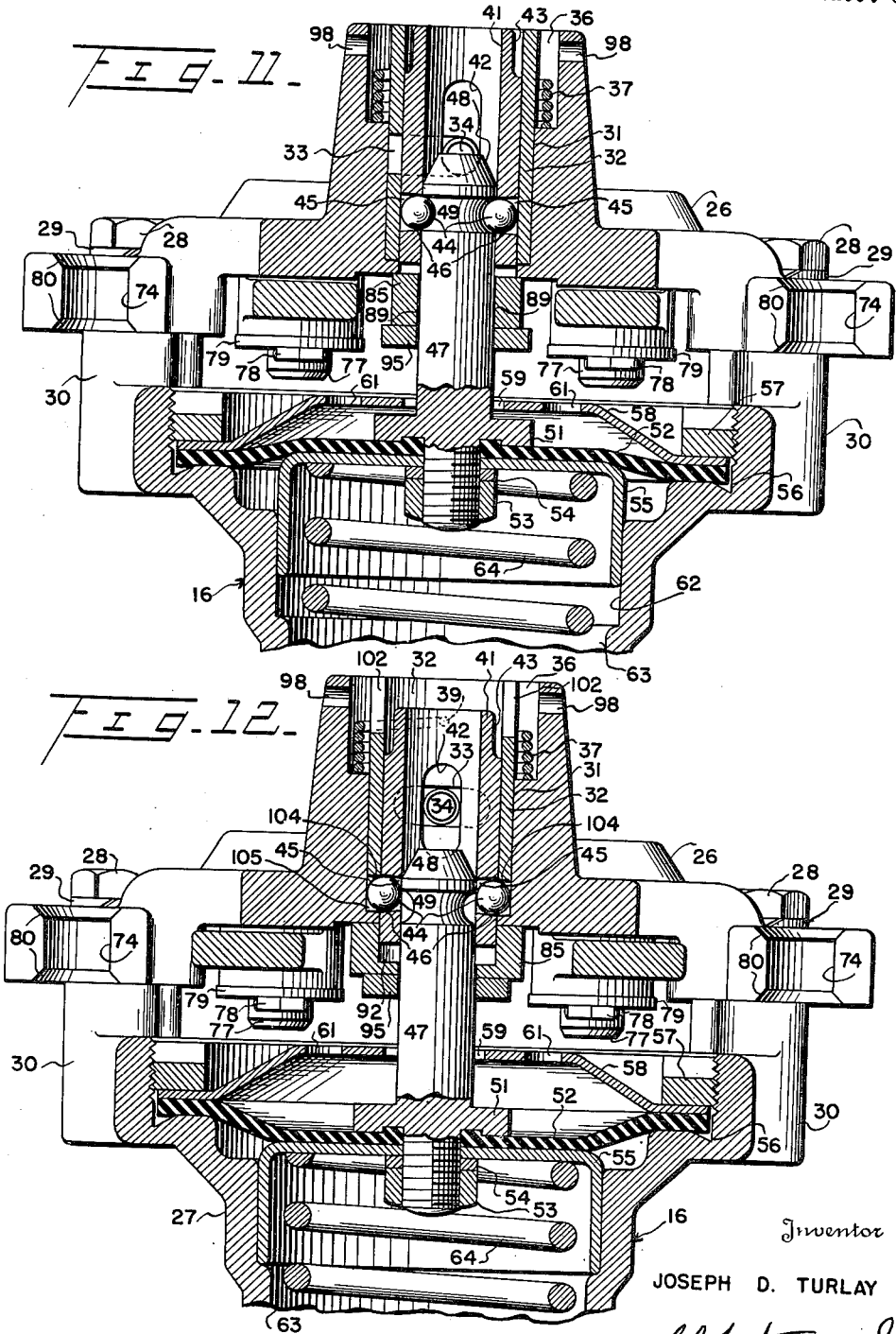

April 26, 1955  J. D. TURLAY  2,706,948
DEPTH REGULATING DEVICE FOR A MOORED MINE
Filed Nov. 17, 1942  9 Sheets-Sheet 9
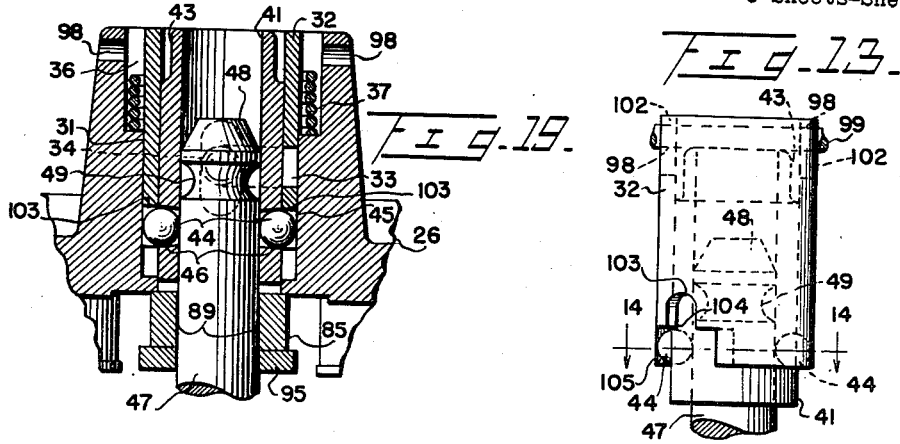
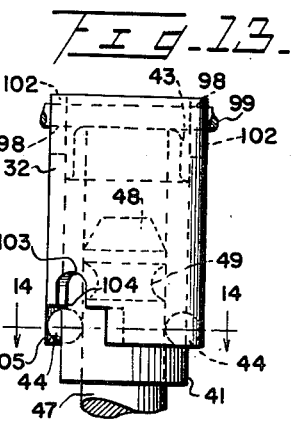
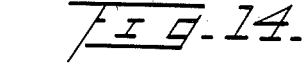
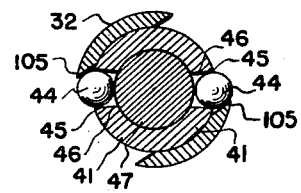
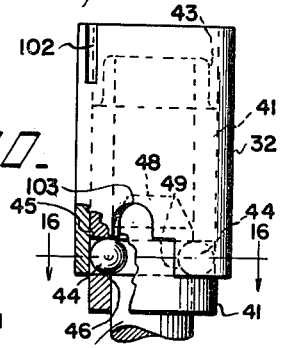
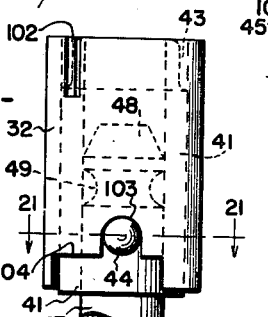
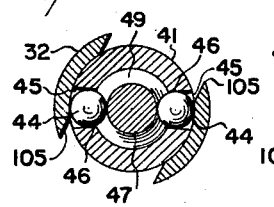
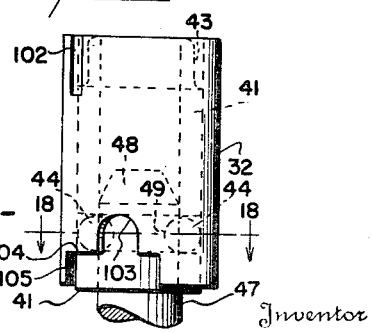
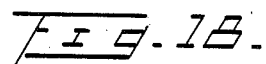
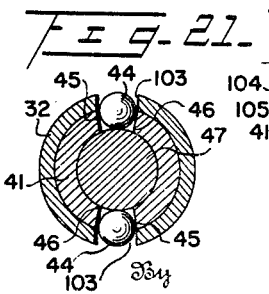
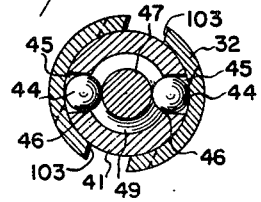
Inventor
JOSEPH D. TURLAY

United States Patent Office 2,706,948
Patented Apr. 26, 1955

2,706,948

DEPTH REGULATING DEVICE FOR A MOORED MINE

Joseph D. Turlay, Montgomery County, Md.

Application November 17, 1942, Serial No. 465,931

15 Claims. (Cl. 102—14)

(Granted under Title 35, U. S. Code (1952), sec. 266)

This invention relates to means for selectively releasing a slack length of mooring cable from a buoyant marine mine and more specifically to a new and improved depth regulating device for releasably maintaining a bight in a portion of the mooring cable adjacent the mine until the mine has risen within the water to a predetermined depth of submersion whereupon the reduction in the tension of the mooring cable as the bight is released causes the cable drum within the mine anchor to lock and the mine to be moored at a predetermined depth of submersion within the water.

In devices heretofore proposed for mooring a submarine mine at a predetermined depth of submergence within a body of water it is the usual practice to employ a sounding ball or plummet connected to the anchor or a float connected to the mine having a predetermined effective length of auxiliary cable connected thereto corresponding in length to the depth at which the mine is planted beneath the surface of the water, or the mooring mechanism may comprise a hydrostatic device connected to the mine having an auxiliary cable connected thereto by means of which a signal is transmitted to the mine anchor when the mine has risen to a predetermined depth of submersion within the water thereby preventing additional paying out of the mooring cable from the anchor. Devices have also been proposed in which a hydrostatic device permanently secured to the flotation chamber of a mine releases a slack length of the mooring cable thereby to arrest the paying out movement from the anchor in response to the sudden pull exerted on the cable by the bight, the hydrostat contraption remaining connected to the flotation chamber after the bight in the cable has been released. Such devices have not proved altogether reliable under the conditions of service by reason of the fact that a fractional part of the tension in the mooring cable is applied to the trigger mechanism of the device thereby impeding the operation of the trigger mechanism sufficiently in certain cases to prevent the release of the aforesaid slack length of the mooring cable as the predetermined depth of submersion is reached.

According to the present invention the arrangement of parts and instrumentalities employed for releasably locking the depth regulating device in a closed position is such that there is no pressure or friction applied to the trigger mechanism thereof by the tension of the mooring cable and thus the device is adapted invariably to release a slack length or bight of mooring cable when the pressure of the water against the hydrostat element of the device has been reduced to a value corresponding to a predetermined depth of submergence of the mine within the water within which the mine is arranged. Furthermore, when the bight in the cable is released, the depth regulating device falls away from the mine concurrently with the release of the bight from the cable and comes to rest on the bed of a body of water and thus, if desired, the depth regulating and release mechanism may be composed in part of ferromagnetic material and employed with magnetically controlled mines without adversely influencing the firing control element of the mine.

The depth regulating and cable release mechanism of the present invention is adapted to be employed with mines released from an attacking craft above the surface of the water or from the torpedo tube of a submarine at any desired depth of submersion, as the case may be, in which the mine and anchor are launched as a unit, the mine and anchor separating during the downward movement thereof through the water at a gradual rate by reason of the buoyancy of the mine and certain speed retarding mechanism operatively connected to the cable drum within the mine anchor which retards the paying out of the mooring cable therefrom. The mine comprises a flotation chamber of sufficient size to impart a positive degree of buoyancy to the moored end thereof, the opposite end of the mine having a lesser degree of negative buoyancy than the flotation chamber, whereby the resulting buoyancy of the mine is positively buoyant. The center of gravity of the mine is preferably arranged sufficiently near the opposite end of the mine such that the mine assumes a substantially horizontal moored position beneath the surface of the water.

As the mine anchor falls away from the flotation chamber during the downward movement of the mine and anchor within the water the pull of the anchor against the mooring cable causes the hydrostatic depth regulating and release device connected thereto to be withdrawn from the recessed portion of the flotation chamber whereby the pull of the flotation chamber against the mooring cable at this time is applied through the locked jaws of the depth control release mechanism. A bight or relatively short length of cable is also connected at one end to the flotation chamber and at the other end thereof to the upper end of the mooring cable thereby to effect a momentary reduction in the tension of the mooring cable sufficient to prevent further paying out of the cable from the mine anchor and thereafter to maintain the mine in a moored condition after the hydrostat release device has fallen away from the mine. As the anchor moves away from the release device, an arming wire secured to the anchor causes a safety pin to be withdrawn from the device thereby rendering the release device responsive to variations in the pressure of the water adjacent thereto.

When the mine has sunk to a predetermined depth of submersion within the water the concurrent movement of the hydrostat element within the depth regulating release device causes the trigger mechanism thereof to perform a cocking or arming operation as a prerequisite requirement to the release of the bight of cable.

When the anchor has been brought to rest on the bed of a body of water the mine rises within the water until the reduction in pressure of the water against the hydrostat element of the release device causes the release mechanism thereof to operate and release the aforesaid bight of mooring cable thus producing a reduction in the tension of the mooring cable which causes a device in the anchor mechanism to operate and lock the cable to the mine anchor thereby mooring the mine at a predetermined depth of submersion, the release mechanism falling away from the mine and coming to rest on the bed of the body of water as the bight of cable is released.

The mine anchor may be of any type suitable for the purpose in which a predetermined reduction in the tension of the mooring cable causes the paying out movement to be arrested, the anchor also including means adapted to retard the paying out of the cable from the cable drum arranged therein such, for example, as the Differential Drum for a Mine Anchor, disclosed and claimed in the copending application of James B. Glennon, Serial No. 635,117, filed September 27, 1932, now patent 2,435,580 issued February 10, 1948, in which a retardation force is applied to the cable drum by a paddle brake during the paying out of the mooring cable therefrom.

One of the objects of the present invention is the provision of new and improved means for releasing a bight in the mooring cable of a submarine mine when the mine has risen to a predetermined depth of submersion within the water.

Another of the objects is the provision of a new and improved cable releasing device adapted to be armed by an increase in the pressure of the water within which the device is submerged and released by a predetermined decrease in the pressure of the water.

Still another object is to provide a new and improved device for releasing a bight in the mooring cable of a submarine mine when the mine has arisen within the water to a predetermined depth of submersion in which the device is dropped to the bed of a body of water as the bight in the cable is released.

Still another object is to provide means for releasing the bight in the mooring cable of a mine in which the force required to operate the releasing mechanism is not effected by the tension in the mooring cable.

A still further object is to provide a new and improved cable releasing device which will be economical to manufacture, reliable in operation and which possesses all of the qualities of ruggedness and durability.

Still other objects, advantages and improvements will be apparent from the following description taken in connection with the accompanying drawings in which:

Fig. 1 shows in diagrammatic form the launching and mooring of a submarine mine employing the device of the present invention;

Fig. 2 is a greatly enlarged view in elevation of the depth regulating and cable releasing device operatively connected to the mooring cable and the mine of Fig. 1;

Fig. 3 is a view of the mine in a moored position after the bight of cable has been released by the device of Fig. 2;

Fig. 4 is a greatly enlarged view of the depth regulating and release mechanism;

Fig. 5 is a plan view of the device of Fig. 4;

Fig. 6 is a view partially in section taken along the line 6—6 of Fig. 4;

Fig. 7 is a plan view of the device showing the jaws in the released position;

Fig. 8 is a view of the device taken along the line 8—8 of Fig. 4;

Fig. 9 is a fragmentary sectional view taken on the line 9—9 of Fig. 5 with the device in the cocked position;

Fig. 10 is a view of the device similar to Fig. 9 with the arming pin and cover removed and the device in a locked position;

Fig. 11 is a view similar to Fig. 10 showing the device in a released position;

Fig. 12 is a view of the device similar to Fig. 9 showing the device in a cocked position when immersed within a body of water of greater depth than the depth at which the device is set to release;

Fig. 13 is a view in elevation partly broken away of a fragment of the locking and releasing trigger mechanism in the position shown on Fig. 9;

Fig. 14 is a view in section taken along the line 14—14 of Fig. 13;

Fig. 15 is a view in elevation partly broken away and partly in section of a fragment of the locking and releasing trigger mechanism in the position shown on Fig. 10;

Fig. 16 is a view taken along the line 16—16 of Fig. 15;

Fig. 17 is a view in elevation partly broken away of a fragment of the locking and releasing trigger mechanism in the position shown on Fig. 11;

Fig. 18 is a view taken along the line 18—18 of Fig. 17;

Fig. 19 is a view partly in section and partly broken away showing the locking and releasing trigger mechanism rotated to a resetting position;

Fig. 20 is a view in elevation similar to Fig. 19 showing a portion of the trigger mechanism not appearing on Fig. 19;

Fig. 21 is a view taken along the line 21—21 of Fig. 20; and,

Fig. 22 is a view in perspective of a bifurcated locking member employed with the present invention.

Referring now to the drawings on which like numerals of reference are employed to designate like parts throughout the several views and more particularly to Fig. 1 thereof there is shown thereon in diagrammatic form a submarine mine indicated generally by the numeral 12 having an anchor 13 detachably secured thereto at the moment of being released from the torpedo tube 14 of a submarine 15, the instant position of the mine and anchor within the water being illustrated at 1 and the relative positions of the mine and anchor during the subsequent movement thereof through the water until the mine is moored at a predetermined depth of submersion within the water controlled by the hydrostatically operated release device 16 being indicated generally by the numerals 2, 3, 4, 5, 6, 7, 8, 9, 10 and 11 respectively. The mine and anchor are preferably cylindrical in shape and releasably connected together thereby to facilitate the planting of the mine from the aforesaid torpedo tube. After leaving the torpedo tube, the mine sinks within the water with the rounded end 17 uppermost, the mine moving to a substantially vertical position within the water illustrated at 5 during the movement of the mine through positions 2, 3 and 4 by reason of the anchor 13 connected thereto. The anchor is detached from the flotation chamber of the mine shortly after the mine is launched from the torpedo tube thereby withdrawing the bight of cable 18 from a recessed portion within the end of the flotation chamber and causing the release device 16 to be withdrawn from a recessed portion of the mine to the position indicated at 4.

As the anchor 13 continues to move downward a mooring cable 19 is paid out therefrom, there being sufficient tension in the cable to maintain the mine in a substantially vertical position until the anchor comes to rest on the bed of the body of water at 6. When this occurs, the mine rises within the water and concurrently therewith is moved angularly to the positions shown at 7, 8, and 9. The mooring cable 19 is paid out from the anchor 13 until the mine rises to a depth of submersion within the water such that the hydrostat device 16 releases the bight 18 of the cable at 10 whereupon the release device 16 falls to the bed of the body of water and the mine assumes the position shown at 11 by reason of the relatively heavy end 17 thereof and the provision of a buoyancy chamber arranged relatively near the opposite end of the mine. As the bight 18 of the cable is released the tension on the cable 19 is momentarily removed thereby causing the anchor mechanism to lock the cable drum and thus prevent further paying out of the mooring cable from the mine anchor.

The mine is provided at the bight end thereof with a bracket 20, Figs. 2 and 3, secured thereto as by the bolts 21 to which is secured a U bolt or shackle 22 having a plurality of links of chain 23 secured thereto to which is releasably affixed the depth regulating device 16. The opposite side of the device 16 is releasably locked to a short length of chain 24 having a U bolt or shackle 25 connected thereto to which the cable 19 is secured. The bight of cable 18 is connected at each end thereof to the shackles 22 and 25 respectively. Whereas in the illustrative embodiment of the invention shown on Figs. 1, 2 and 3 the cable 19 is releasably connected to the depth regulating release device 16 by a short length of chain 24, it will be understood that, if desired, the chain 24 may be omitted and the shackle 25 connected directly to the release device 16. In Figs. 2 and 3 the mechanism employed for detachably securing the anchor to the end of the mine 12 prior to launching of the mine is not shown for the reason that this mechanism is well known in the art and forms no part of the present invention. On Fig. 2 is shown the release mechanism 16 operatively connecting the mine to the mooring cable 19 substantially in the position which it assumes during the movement of the mine through the water while the mooring cable is being paid out from the mine anchor and on Fig. 3 is shown the mine moored by the bight of cable 18 and mooring cable 19 after the release device 16 has been released therefrom.

The release device 16 comprises a head or support 26 secured to a casing 27 as by the bolts 28, a pair of washers 29 being arranged preferably beneath the heads of the bolts 28, Figs. 4 to 12. The casing 27 is provided with a pair of lugs 30 extending therefrom within which the bolts 28 are threaded thereby to secure and space the head a predetermined distance from the casing. The head 26 is provided with a cylindrical portion 31 within which is rotatably mounted a cylindrical member 32 provided with an arcuate slot 33 therein adapted to receive the end portion of a stop screw 34 threaded within the head and maintained in the assembled position thereby in by the washer 35. The member 32 is thus permitted a limited degree of rotative movement within the head 26 controlled by the length of the arcuate slot 33. Within the circular recessed portion 36 of the head is arranged a spring 37 having one end arranged within the recessed portion 38 of the head and the other end within the recessed portion 39 of the cylindrical member 32 whereby the member 32 is urged rotatably in a counter-clockwise direction by the spring 37. Slideably arranged within the cylindrical member 32 is a cylindrical locking member 41 having an axially arranged elongated slot 42 therein within which the end portion of the screw 34 is disposed thereby providing an arrangement in which the locking member 41 is adapted to be moved axially without substantial rotation within the cylindrical member 32. The upper end of the locking member 41 is reduced in diameter as at 43 thereby to prevent interference of the member 41 with the spring 37.

There is also provided a pair of locking balls 44 respectively disposed within suitable apertures 45 diametrically arranged within the member 41 and preferably provided with reduced portions 46 at the inner ends of the apertures of slightly less diameter than the diameter of the balls thereby to prevent the balls from falling into the interior portion of the cylindrical member 41 during the assembly of the device. Slidably arranged within the member 41 is a rod or plunger 47 having a tapered end 48 and an annular recessed portion 49 adjacent thereto of sufficient size to engage and seize the balls 44 when the plunger has been moved sufficiently within the recessed portion 49 thereof to be opposite the balls or the member 41 has moved the balls into apposition with the recessed portion 49, as the case may be. The lower end of the plunger is provided with a shoulder or collar 51 to which is clamped a resilient diaphragm 52 as by the nut 53 and split washer 54, a cup-shaped member 55 being preferably arranged between the washer and the diaphragm. The diaphragm 52 is sealed at the outer portion thereof within a circular recess 56 by a clamping ring 57 threaded therein, an annular stop member 58 being arranged between the clamping ring and the diaphragm in the manner shown on the drawings and having an aperture 59 therein within which the plunger 47 is adapted to slide. The stop member 58 is also provided with a plurality of apertures 61, Figs. 9 and 10, adapted to admit the passage of water therethrough into contact with the outer surface of the flexible diaphragm.

The cup-shaped member 55 is adapted to be slidably moved within the recessed portion 62 within the casing 27. The casing 27, it will be noted, is provided with a well 63 therein within which the spring 64 is arranged having one end thereof in registered engagement with the cup-shaped member 55 and the other end in engagement with the cup-shaped member 65. The member 65 is supported by a screw 66 at the reduced upper portion 67 thereof whereby the screw 66 is adapted to rotate with respect to the member 65 and at the shoulder 68 thereof urge the member 65 upwardly with respect to the casing 27 thereby maintaining a continuous pressure of the spring 64 against the member 55. An arrangement is thus provided in which the device is adapted to release the bight of the cable at a predetermined depth within the water in accordance with the setting of the adjustable screw 66.

The lower end of the casing 27 is sealed with a plug or a threaded cap 69 preferably having a recessed portion 71 therein adapted to receive the head of the screw 66 and provided with a gasket 72 thereby to exclude water from the well 63 formed within the casing 27. Whereas in the illustrative embodiment of the invention shown on Fig. 8 the screw 66 is threaded within a sleeve 73 secured to the casing 27 in any suitable manner as by welding the parts together, it will be understood that, if desired, the sleeve 73 may be formed integrally with the casing 27.

The support 26 is provided with a pair of arcuate portions 74 adapted to be brought into engagement with complementary recessed portions 75 arranged on the pair of jaws 76 pivotally mounted on the studs 77 and rotatably secured thereto as by the cotter pins 78 and washers 79. Each of the arcuate recessed portions 74 and 75 is preferably shaped in a semi-circular recess as at 80 thereby to form a pair of flared circular openings when the jaws are in a closed position. The jaws 76 are pivotally connected to one end of a pair of link members 81 respectively as by the clevis pins 82 and cotter pins 83, the other end of each of the link members being connected to a bifurcated locking member 85 as by the clevis pins 86, cotter pins 87 and washers 88. The locking member 85 is provided with two parallel surfaces 89 in slideable engagement with a raised or rib portion 91 arranged on the head 26. The bifurcated member 85 is recessed as at 92 thereby to receive the lower end of the locking member 41 and prevent movement of the bifurcated member from the retracted position thereof until the locking member 41 is withdrawn from the path of travel of the surfaces 89 of the bifurcated member. There is also provided a continuous spring 93 arranged about each of the clevis pins 86 having two downwardly projecting hooked ends 94 in engagement respectively with the upper one of each pair of link members 81 and adapted to urge the bifurcated member 85 outwardly and the jaws 76 to a release position, Fig. 7, as the locking member 41 is withdrawn from the path of travel of the surfaces 89. The bifurcated member 85 is maintained in slideable engagement with the raised portion 91 of the support 26 by a plate 95 secured thereto as by the screws 96 and washers 97, the plate being provided with an aperture therein within which the plunger 47 is adapted to move.

There is provided within the upper portion of the support 26 a pair of diametrically arranged apertures 98 adapted to receive an arming pin 99, the arming pin also passing through a pair of apertures within a detachable cover 101. The member 32 is provided with a pair of diametrically arranged slotted portions 102 through which the arming pin is adapted to pass whereby angular movement of the member 32 is prevented until the arming pin has been removed. The arming pin is also in abutting relation with the upper end of the member 41 whereby the member 41 is prevented from axial movement upward until the arming pin has been withdrawn and thus the balls 44 are prevented from locking the plunger 47 to the locking member 41 when the arming pin is inserted within the support 26 and the hydrostat element, therefore, may be moved from the retracted position to the fully operated position thereof or vice versa without the possibility of locking the plunger to the member 41 until the arming pin has been withdrawn from the support.

The member 41, it will be recalled, is provided with an arcuate slot 33 within which is arranged the inner end of the stop screw 34, the end of the screw 34 also passing through an axial slot 42 within the member 41 whereby the member 32 may be rotated through a predetermined angle controlled by the length of the slot 33. It will also be recalled that the member 32 is urged clockwise by the spring 37 secured thereto. By inserting a suitable tool within the cylindrical portion 31 of the support 26 after the arming pin and cap 101 have been removed, the member 32 may be rotated in a counterclockwise direction to the limit of its angular travel with the ends of the members 32 and 41 in substantially coinciding planes. The pair of apertures within the member 41 are in alinement with the arcuate cut away portions 103 within the lower end of the member 32 and the plunger 47 is thus released from locking engagement with the member 41, Figs. 20 and 21. By pressing downwardly on the aforesaid tool, the member 41 may be moved downwardly until the balls 44 have moved below a pair of shoulders 104, Fig. 13. As the balls move beyond the recessed portion 49 of the plunger 47, they are forced outwardly by the movement of the member 41 a sufficient distance to permit the balls to pass beneath a pair of shoulders 104 arranged on the lower portion of the member 32, the member 32 is rotated until the balls move into locking engagement with a pair of cam surfaces 105 in abutting relation with the aforesaid shoulders 104, Figs. 13 and 14, and are retained in this position by the spring 37 after the key has been withdrawn.

As the plunger 47 moves to a positon such that the annular recessed portion 49 thereof is opposite the pair of balls, the balls are forced inwardly by the cam surfaces 105 concurrently with the additional rotative movement of the member 32 by the spring 37 until the rotation of the member 32 is arrested by the engagement of the end of the arcuate slot 33 therein with the stop screw 34, Figs 15 and 16. When this occurs, the plunger 47 is locked to the locking member 41 by the pair of balls 44 which are prevented from moving outwardly by the inner cylindrical surface of the member 32. As the plunger 47 moves upwardly in response to reduction in pressure of the water within which the device is submerged, the member 41 locked thereto moves upwardly out of locking engagement with the recessed portions 92 of the bifurcated member 85, Figs. 17 and 18, thereby releasing the jaws 76 and causing the jaws to be moved to the open or released position by the toggle spring 93.

The operation of the device will now be described.

Let it be assumed by way of example that the device is connected to the mine of Fig. 1 and the mine is launched within a body of water from a mine laying craft of the type known in the art as a mine layer or from the torpedo tube of a submarine at a depth of submergence less than the depth at which the device is set to release the bight of cable and that the device has been cocked with the balls 44 in engagement with the cam surfaces 105 of the member 32. As the device sinks within the water, an arming wire 106 connected to the anchor 13 and to the arming pin 99 respectively causes the arming pin to be withdrawn from the head 26 as the anchor moves away from the device thereby disengaging the cap 101 from the head 26 and removing the restraint from the members 32 and 41. As the device continues to sink within the water, the plunger 47 moves downwardly until the annular recessed portion 49 thereof is in apposition with the pair of balls 44. When this occurs, the balls 44 are forced inwardly by the cam surfaces 105 within the recessed portion 49 thereby causing the member 32 to be rotated by the spring 37 until the member is arrested by the stop screw 34. The balls are now locked within the recessed portion 49 by the member 32 and the plunger 47 is thus locked to the member 41.

When the mine has risen within the water to a depth such that the reduction in the pressure of the water against the hydrostat diaphragm 52 causes the plunger 47 to be moved upwardly by the spring 64 sufficiently for the lower end of the member 41 locked thereto to be moved outwardly from the recessed portions 92 of the bifurcated member 85, the spring 93 causes the bifurcated member to be moved outwardly and the jaws 76 to be moved to open position thereby releasing the bight 18 of the cable. The release device 16 now falls freely through the water and comes to rest on the bed of the body of water and the sudden release in tension of the cable 19 as the jaws 76 of the release device are opened causes the cable drum within the anchor 13 to lock and prevent further paying out of the mooring cable. The mine 12 is thus moored at a predetermined depth of submersion in accordance with the setting of the adjusting screw 66 of the release device.

The link members 81, it will be noted, are arranged in such a manner that the clevis pins passing therethrough are arranged in a plane when the jaws 76 are in a locked position and thus there is absolutely no pressure applied to the bifurcated member 85 by the jaws while the device is locked. An arrangement is thus provided in which the cylindrical member 41 may be moved at all times into locking engagement with the recessed portions 92 of the bifurcated member 85 without the possibility of friction between the member 41 and the bifurcated member as the result of tension applied to the locking jaws 76 by the cable 19. Furthermore, by employing a toggle arrangement in the manner disclosed the initial movement of the jaws 76 from the locked position thereof is small with respect to the movement of the bifurcated member and for this reason a considerable amount of power is applied to the jaws 76 by the spring 93 during the initial movement of the jaws from the locked position thereof and thus the device operates easily and positively to release the bight of the cable when the device is raised within the water to a predetermined depth of submersion. Furthermore, by employing a toggle arrangement in which the jaws 76 are linked to a rigid member 85 adapted to slide within a plane equidistant from the supporting pins about which the jaws are pivotally mounted and at right angles to the plane within which the axes of the supporting pins lie, a symmetrical arrangement is provided in which the jaws move synchronously with respect to each other and thus there is no possibility of the device failing to release from the mine and from the cable 19 as the jaws move to open position.

In the event that the mine should be launched from the torpedo tube of a submarine at a depth of submergence greater than the depth at which the recessed arcuate portion 49 of the plunger 47 is opposite the balls 44, or be launched at such a depth that the arming pin 99 is not removed from the head 26 until the plunger has moved to the position shown on Fig. 12, the plunger will be in a retracted position such that the balls 44 are prevented from moving inwardly sufficient to release the member 32 for rotation. As the mine moves upwardly within the water the plunger 47 is moved upwardly by the spring 64 until the balls 44 move into registered engagement with the annular recessed portion 49 thereby causing the member 32 to rotate and lock the plunger to the member 41. As the mine continues to move upwardly the plunger 47 is moved by the spring 64 until the plunger and member 41 have been moved to a release position, Fig. 11, such that the lower end of the member 41 is disengaged from the bifurcated member 85 thereby releasing the device.

When, during the assembly and test of the device it is desired to lock and unlock the jaws or otherwise cause the device to perform a cycle of operations, this may be accomplished in a relatively simple manner without moving the hydrostat element from the released position thereof during the cocking of the mechanism, it being merely necessary to rotate the member 32 counter-clockwise by means of a suitable tool inserted within the slotted portions 102 thereof until the balls 44 are in alinement with the cut away portions 103 of the member 32. The member 41 is now unlocked from the plunger 47 and may be moved inwardly by the aforesaid tool until the balls 44 pass beneath the shoulders 104 of the member 41. When this occurs, the spring 37 causes the cylindrical member 32 to rotate until the cam portions 105 thereof engage the balls and arrest further angular movement of the member 32. The device is now in a cocked position. The jaws 76 may be released by momentarily depressing the plunger 47 until the recessed portion 49 thereof is in registered engagement with the balls 44 whereupon the cylindrical member 41 is additionally rotated by the spring 37 to a locked position such that the plunger is locked to the member 41. As the plunger is moved outwardly by the spring 64 in response to a decrease to a predetermined value of the external pressure applied thereto, the member 41 moves out of engagement with the bifurcated member 85 and releases the jaws.

By providing an arrangement in which the jaws 76 including the semi-circular portions 74 are adapted to secure a pair of links of the chains 23 and 24 respectively or the chain 23 to the shackle 25, as the case may be, in releasable locked engagement with complementary semi-circular portions 72 within the head 26, an arrangement is provided in which a fractional part only of the tension of the mooring cable is applied to the jaws, the remainder of the tension being applied to the arcuate portions 74 of the head and the frictional load of the jaws against the clevis pins 77 about which the jaws are pivoted is thereby reduced such that there is no possibility of failure of the jaws to open when released by the locking member 41.

Furthermore, by providing a head or support 26 secured to the casing 27 by the pair of bolts 28 in the manner disclosed, the hydrostat element may be separately tested before assembly with the locking and release mechanism supported by and within the head 26, it being merely necessary to clamp the head to the casing 27 by the bolts 28 after the testing operation has been completed. It will, of course, be understood that with the safety pin 29 in the assembled position within the head 26 the hydrostat may be removed at any time therefrom for inspection and test by merely removing the pair of bolts 28 or, if desired, the hydrostat may be exchanged for a hydrostat set for a different depth of submersion at which the release of the bight of cable is to be effected without disturbing in any way the mechanism assembled within the head.

By providing a release mechanism in which the hydrostat element is locked to the member 41 only in response to the rotation of the member 32, an arrangement is provided in which the device can not be prematurely released by a shock or impulse applied thereto. Also by arranging the locking mechanism such that the jaws 76 are moved to the open position by the locking member 85 and spring 93, an arrangement is provided in which the power required for operating the jaws to open position is obtained from energy stored entirely within the device, the movement of the jaws to open position being independent of the tension of the mooring cable. In the depth regulating device herein disclosed the trigger mechanism for releasing the locking jaws is included entirely within the device and is therefore protected against damage or injury thereto as the result of shocks or blows to which the device may be subjected during the handling, transportation and planting of the mine. Also by providing a trigger mechanism comprising a plurality of nested elements, the elements may be supplied with a suitable lubricant such that the device may be stored for long periods of time without the possibility of failure of the device to operate as the result of rust or corrosion of the trigger mechanism, the lubricant being preserved and the possibility of the entrance of dirt or foreign matter within the mechanism being prevented by the detachable cap or cover 101.

Briefly stated in summary, the present invention provides a new and improved depth regulating device controlled by the pressure of the water adapted to release a bight of cable when the pressure of the water adjacent thereto has been reduced to a predetermined value and thereby cause a submarine mine to be moored at a predetermined depth of submersion within the water, in which the device is cocked when the pressure of the water adjacent thereto has reached a relatively greater value, the device falling away from the mine into engagement with the bed of the body of water when the bight of cable is released, and in the arrangement of parts and instrumentalities employed such that the trigger mechanism is entirely enclosed within the device and protected from mechanical damage or injury, the premature operation of the device being prevented by an arming pin detachably secured thereto which is automatically withdrawn as the mine anchor separates from the mine or flotation chamber during the travel of the mine and anchor downward through the water.

While there is shown and described herein a certain preferred embodiment of the invention, many other and varied forms and uses will present themselves to those versed in the art without departing from the invention, and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. A device for releasing a bight in a submarine cable, a support having a pair of fixed jaws formed therein, a pair of movable jaws, a pair of bearing pins carried in mutally spaced relation by said support upon which the movable jaws are respectively mounted such that the movable jaws complement the fixed jaws in a manner to hold the bight in the cable when the jaws are in a closed position, means including a toggle device attached to the jaws for releasably locking the jaws in said closed position, and toggle release means responsive to a predetermined reduction in the pressure of the water within which the device is submerged for unlocking the jaws thereby to release said bight and disconnect the device from the cable.

2. In a device of the character disclosed for releasably maintaining a bight in the mooring cable of a submarine mine, means including a pair of movable jaws for preventing the release of said bight when the jaws are in a closed position, means including a toggle device for locking the jaws in said closed position, means including a resilient member operatively connected to said toggle device adapted to move the jaws synchronously to an open position, and means responsive to a predetermined reduction in the pressure of the water adjacent the device for releasing said toggle device.

3. In a device of the character disclosed for releasing a bight of mooring cable of a submarine mine at a predetermined depth of submersion within a body of water, in combination, a pair of movable jaws adapted to maintain said bight when the jaws are in a closed position, means for releasably locking the jaws in said closed position, a toggle device adapted to synchronize said jaws during the movement thereof to an open position, a releasable locking member operatively connected to said toggle device and adapted to release said locking means, a resilient spring operatively connected to said toggle device adapted to actuate said jaws to open position as the locking member is released, and means responsive to a predetermined decrease in the pressure of the water within which the device is submerged for releasing said locking member.

4. A device for releasing a bight in a mooring cable comprising a head, a pair of movable jaws pivotally secured to said head and having arcuately shaped recessed portions therein adapted to coact with complementary recessed portions within the head when the jaws are in the closed position, a buoyant mine to which said bight of cable is connected, means arranged in part within the arcuate portion of one of said jaws for releasably connecting the device to the mine, means arranged in part within the arcuate portion of the other of said jaws for releasably connecting the device to said mooring cable, means including a toggle device for releasably locking said jaws in said closed position, a source of energy arranged within the device adapted to move said jaws to an open position, and a trigger mechanism adapted to release said toggle device and jaws in response to a predetermined reduction in the pressure of the water adjacent the device thereby to release said bight of cable and cause the device to be disconnected therefrom and from the mine as the jaws move to said open position.

5. In a device of the character disclosed for releasing a bight in the mooring cable of a submarine mine, the combination of a support, a pair of movable locking devices arranged on said support adapted normally to maintain the bight in said cable, means including a toggle device for releasably locking said release devices in closed position, a bifurcated member operatively connected to said toggle device and slideably arranged within said support, a resilient device operatively connected to said toggle device adapted to move the bifurcated member from an initial locked position thereof and thereby actuate said locking devices to open position, means for releasably locking the bifurcated member in said initial position, and means responsive to a predetermined decrease in the pressure of the water against the device for disconnecting said locking means from the bifurcated member.

6. A device of the character disclosed for releasably maintaining a bight in the mooring cable of a submarine mine, in combination, an anchor adapted to pay out a length of said mooring cable therefrom, a hydrostat device adapted to release said bight in the cable when the device has been raised by the mine to a predetermined depth of submersion within the water, a head for said device having a plurality of movable means arranged therein adapted to arm the device at a substantially greater depth of submersion within the water, means for actuating said arming means, an arming pin arranged within said head in the path of travel of said arming means, and means controlled by the degree of separation of the anchor from the mine for withdrawing the arming pin from said head as the anchor moves downward within the water.

7. A depth regulating device for a submarine mine adapted to release a bight of cable as the mine moves upward within the water, a pair of movable jaws on said device having recessed portions respectively arranged therein and adapted to be closed when the jaws are in an initial locked position, means arranged in part within the aperture of one of said jaws for releasably connecting the device to the mine, means arranged in part within the aperture of the other of said jaws adapted to connect the device releasably to said cable, an arming pin arranged within the device and adapted to be removed therefrom during the downward movement of the mine within the water, a cylindrical member rotatably supported within said device, a second cylindrical member slideably supported within said first named cylindrical member and having a plurality of apertures arranged therein, a plurality of balls arranged within each of said apertures respectively, a plunger slideably arranged within said second cylindrical member and having an annular recessed portion adapted to be brought into alinement with said balls when the device has been submerged to a predetermined depth within the water, a pair of cam surfaces on said first named cylindrical member adapted to urge the balls into locking engagement with said annular recessed portion on the plunger, means for rotatably urging said first named cylindrical member in a direction to force the balls against said plunger, a slideable bifurcated member within which the plunger is arranged having a complementary recessed portion therein adapted to be locked by said second cylindrical member, a hydrostat element operatively connected to said plunger adapted to move said second cylindrical member out of locking engagement with the bifurcated member as the plunger moves in a predetermined direction in locked engagement with said second cylindrical member, and means including a toggle device controlled by the bifurcated member for releasing said jaws when the device is raised within the water to a predetermined depth.

8. In a depth regulating device of the character disclosed for selectively releasing a bight in the mooring cable of a submarine mine, the combination of cable releasing means including a normally locked toggle device, means for releasing said toggle device, a trigger mechanism adapted to release said toggle releasing means when the pressure of the water adjacent the depth regulating device has been reduced to a predetermined value, and a source of stored energy adapted to actuate the toggle device to a release position independently of the tension in the mooring cable.

9. In a device of the character disclosed for releasably maintaining a bight in the mooring cable of a submarine mine, means including a pair of movable jaws for preventing the release of said bight when the jaws are in a closed position, means for locking the jaws in said closed position, and means including a toggle device for simultaneously releasing the jaws when the pressure of the water adjacent the device has been reduced to a predetermined value.

10. In a device of the character disclosed for releasing a bight in the mooring cable of a submarine mine, the combination of a movable plunger, a resilient spring adapted to urge the plunger yieldably in one direction, a flexible diaphragm in communication with the water adapted to actuate the plunger variably to different positions in accordance with the instant depth of submergence of the device within the water, means for arming the device when the plunger has been moved through a predetermined distance by the pressure of the water against the flexible diaphragm, said arming means comprising a cylindrical member within which the plunger is slidably arranged, means for locking the plunger to said cylindrical member as the plunger moves through said predetermined distance, and means for causing said bight in the mooring cable to be released when the cylindrical member is moved to a release position by said plunger in response to a predetermined decrease in the pressure of the water against said diaphragm.

11. A device of the character disclosed for releasing a bight of cable selectively in accordance with the depth of submergence of the device within a body of water, means including a pair of rotatable jaws adapted to maintain the bight in the cable while the jaws are in a closed position, toggle mechanism adapted to maintain the jaws releasably in said closed position, a bifurcated member operatively connected to said toggle mechanism having a recessed portion therein, a tubular bolt slideably arranged within said recessed portion and adapted to prevent movement of the bifurcated member until the bolt is removed therefrom, a plunger slideably arranged within said tubular bolt, means for actuating said plunger to different positions selectively in accordance with the depth of submergence of the device within the water, a rotatable cylindrical member within which said tubular bolt is adapted to slide, means for maintaining said cylindrical member in predetermined space relation with respect to said tubular bolt until the plunger has been moved to a predetermined setting, means effective when the plunger has moved to said predetermined setting for rotating said cylindrical member to a final setting whereby the plunger is brought into locked engagement with said tubular bolt, and a source of stored energy adapted to actuate said bifurcated member and jaws to a released position as the tubular bolt is withdrawn by the plunger from locking engagement with the recessed portion of said bifurcated member.

12. In a depth regulating device for a moored marine mine, in combination, an anchor adapted to pay out a length of mooring cable therefrom, a buoyant mine secured to said mooring cable, said cable having a bight at the upper end thereof, a hydrostatic device detachably secured to the mine adapted to maintain said bight within the cable until the mine has risen to a predetermined depth of submersion within the water, trigger mechanism comprising a rotatable cylindrical member, said cylindrical member having an armed position and a locked position, means adapted to rotate said cylindrical member, a tubular bolt slideably arranged within said cylindrical member, a plunger slideably disposed within said tubular bolt, said plunger having a recessed annular portion therein, means arranged within said tubular bolt adapted to arrest the cylindrical member in said armed position and cause the cylindrical member to be rotated to said locked position as the arcuate portion within the plunger is brought into apposition with the arresting means, a hydrostatic device operatively connected to said plunger and adapted to move the plunger into different positions in accordance with the pressure of the water adjacent thereto, means effective when said cylindrical member has moved to said locked position for causing the tubular bolt to be actuated by said plunger to a released position in response to a predetermined decrease in the pressure of the water adjacent said hydrostatic device, and means effective when said tubular bolt is moved to said released position for releasing said bight in the mooring cable.

13. A submarine mine comprising a flotation chamber, a mooring cable having a bight therein secured to the mine, an anchor adapted to pay out a length of said mooring cable, a pair of movable jaws adapted to hold the bight in the cable when the jaws are in a closed position, means including a toggle device for actuating said pair of jaws to an open position as the mine rises to a predetermined depth of submergence, means including an arming pin for rendering said actuating means ineffective until the pin is withdrawn, and means controlled by the pressure of the water for withdrawing said pin.

14. A device of the character disclosed for selectively releasing a bight in a submarine cable, said device comprising a pair of movable jaws adapted to maintain the bight in the cable when the jaws are in a closed position, a toggle device adapted to synchronize said jaws during movement thereof to an open position, means including a resilient member operatively connected to the toggle device and adapted to actuate the jaws to an open position when the pressure of the surrounding water decreases to a predetermined amount, and means settable at will for controlling the depth within the water at which said jaws are actuated.

15. A device of the character disclosed for selectively releasing a bight in a submarine cable, said device comprising a support, a pair of mutually spaced bearing members on said support, a pair of movable jaws mounted for pivotal movement on said bearing members respectively and adapted to maintain the bight in the cable when the jaws are in a closed position, a toggle device having means for releasably locking said jaws in said closed position, said toggle device comprising a pair of rigid members pivotally attached respectively to said pair of movable jaws, resilient means engaging each of said rigid members for yieldably urging the movable jaws to an open position, release means for said toggle device operatively connected thereto, and hydrostatically responsive means for operating said release means and settable at will for adjusting the depth within the water at which said resilient means is effective to actuate the toggle device.

References Cited in the file of this patent

UNITED STATES PATENTS

| 1,296,273 | Elia | Mar. 4, 1919 |
| 1,310,586 | Straub et al. | July 22, 1919 |
| 1,506,784 | Sperry | Sept. 2, 1924 |

FOREIGN PATENTS

| 127,897 | Great Britain | June 19, 1919 |
| 160,181 | Great Britain | Apr. 14, 1921 |
| 39,186 | Norway | June 23, 1924 |